US012619406B2

(12) United States Patent     (10) Patent No.:   US 12,619,406 B2

Chen et al.     (45) Date of Patent:    May 5, 2026

(54) CLOUD NATIVE AUTO-LABELING SYSTEM TO TRAIN CODE GENERATION MODELS

(71) Applicant: Red Hat, Inc., Raleigh, NC (US)

(72) Inventors: Huamin Chen, Newton, MA (US); Chen Wang, Chappaqua, NY (US)

(73) Assignee: Red Hat, Inc., Raleigh, NC (US)

( * ) Notice: Subject to any disclaimer, the term of this patent is extended or adjusted under 35 U.S.C. 154(b) by 285 days.

(21) Appl. No.: 18/455,284

(22) Filed: Aug. 24, 2023

(65) Prior Publication Data

US 2025/0068409 A1     Feb. 27, 2025

(51) Int. Cl.

| | |
|---|---|
| *G06F 8/41* | (2018.01) |
| *G06F 8/65* | (2018.01) |
| *G06F 8/77* | (2018.01) |
| *G06F 11/30* | (2006.01) |
| *G06F 11/34* | (2006.01) |
| *G06N 3/08* | (2023.01) |
| *G06N 20/00* | (2019.01) |

(52) U.S. Cl.

CPC .............. *G06F 8/4432* (2013.01); *G06F 8/65* (2013.01); *G06F 8/77* (2013.01); *G06F 11/302* (2013.01); *G06F 11/3062* (2013.01); *G06F 11/3466* (2013.01); *G06N 3/08* (2013.01); *G06N 20/00* (2019.01)

(58) Field of Classification Search

CPC . G06F 8/4432; G06F 8/65; G06F 8/77; G06F 11/302; G06F 11/3062; G06F 11/3612; G06F 2201/865; G06N 3/08; G06N 20/00

See application file for complete search history.

(56) References Cited

U.S. PATENT DOCUMENTS

| | | | | |
|---|---|---|---|---|
| 11,307,971 | B1 * | 4/2022 | Weldemariam ..... | G06F 16/2379 |
| 2014/0325481 | A1 * | 10/2014 | Pillai ................... | G06F 11/3003 |
| | | | | 717/124 |
| 2015/0052372 | A1 | 2/2015 | Barde et al. | |
| 2020/0019492 | A1 * | 1/2020 | Fei ........................... | G06N 7/01 |
| 2022/0224121 | A1 | 7/2022 | Jha et al. | |
| 2023/0136437 | A1 | 5/2023 | Bagwell et al. | |
| 2025/0005690 | A1 * | 1/2025 | Treadwell .............. | G06N 20/00 |

OTHER PUBLICATIONS

"Extended European Search Report" for the application No. 23209835. 0, mailed on Apr. 26, 2024. pp. 1-9.

Chen, "How the Kepler Project is Working to Advance Environmentally-Conscious Efforts", Data & Storage Asean, published Mar. 17, 2023, located at https://datastorageasean.com/expert-opinions-opinion-byline/how-kepler-project-working-advance-environmentally-conscious-efforts, 2 pages.

(Continued)

*Primary Examiner* — Geoffrey R St Leger

(74) *Attorney, Agent, or Firm* — Womble Bond Dickinson (US) LLP

(57) ABSTRACT

Systems and methods are disclosed that deploy software code from a dataset into a computing environment. The systems and method collect energy metrics of the software code while executing in the computing environment. The systems and methods determine a sustainability label for the software code based on the energy metrics. The systems and methods assign the sustainability label to the software code to produce a sustainability-based dataset.

20 Claims, 9 Drawing Sheets

(56) References Cited

OTHER PUBLICATIONS

Foster, "Kepler project aims to help curb Kubernetes energy waste", TechTarget, published Feb. 1, 2023, located at https://www.techtarget.com/searchitoperations/feature/How-to-approach-sustainability-in-IT-operations, 4 pages.

Lawrence, "Kubernetes is transforming software development into greener code", published May 11, 2023, Tech.eu, located at https://tech.eu/2023/05/11/kubernetes-shows-a-greneer-future-for-commercial-software/, 8 pages.

Kepler, "Monitoring Container Power Consumption with Kepler", Sustainable Computing, downloaded on Jun. 20, 2023, located at https://sustainable-computing.io/design/metrics/, 5 pages.

Txture "Green Cloud Assessment", txture, downloaded on Jun. 21, 2023, located at https://txture.io/en/product/green-cloud-assessment, 15 pages.

Moro et al., "A Framework to Predict Consumption Sustainability Levels of Individuals", Sustainability, 2020, vol. 12, pp. 1423-1429, published Feb. 14, 2020, 27 pages.

* cited by examiner

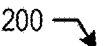

200

Energy Metrics
165

Analyze energy metrics and determine an amount of
actions per joule per unit of time
210

Compute sustainability value based on the amount
of actions
220

Locate previous releases of software code and their
corresponding sustainability information
230

History Store
175

Determine new sustainability label based on
comparing current sustainability value with previous
sustainability information
240

Store new sustainability information for future
release analysis
250

Assign sustainability label to software code
260

SB Dataset
185

FIG. 2

| History Table 310 | | | |
|---|---|---|---|
| Software Code Name | Release | Sustainability Value | Sustainability Label |
| Microservice A | | | |
| | 1 | 75 | G |
| | 2 | 65 | R |
| | 3 | 78 | G |
| | 4 | 82 | G |
| | 5 | 73 | Y |
| | 6 | 85 | G |

Previous Releases 320

New Release 330

FIG. 3A

| Sustainability-Based Dataset Table 340 | | |
|---|---|---|
| Software Code Name | Release | Sustainability Label |
| Microservice A | 5 | Y |
| | 6 | G |
| Microservice B | 2 | R |
| | 3 | Y |
| App C | 8 | G |
| | 9 | G |

Deploying software code from a dataset into a computing environment
410

Collecting energy metrics of the software code while executing in the computing environment
420

Determining a sustainability label for the software code based on the energy metrics
430

Assigning the sustainability label to the software code to produce a sustainability-based dataset
440

600 —

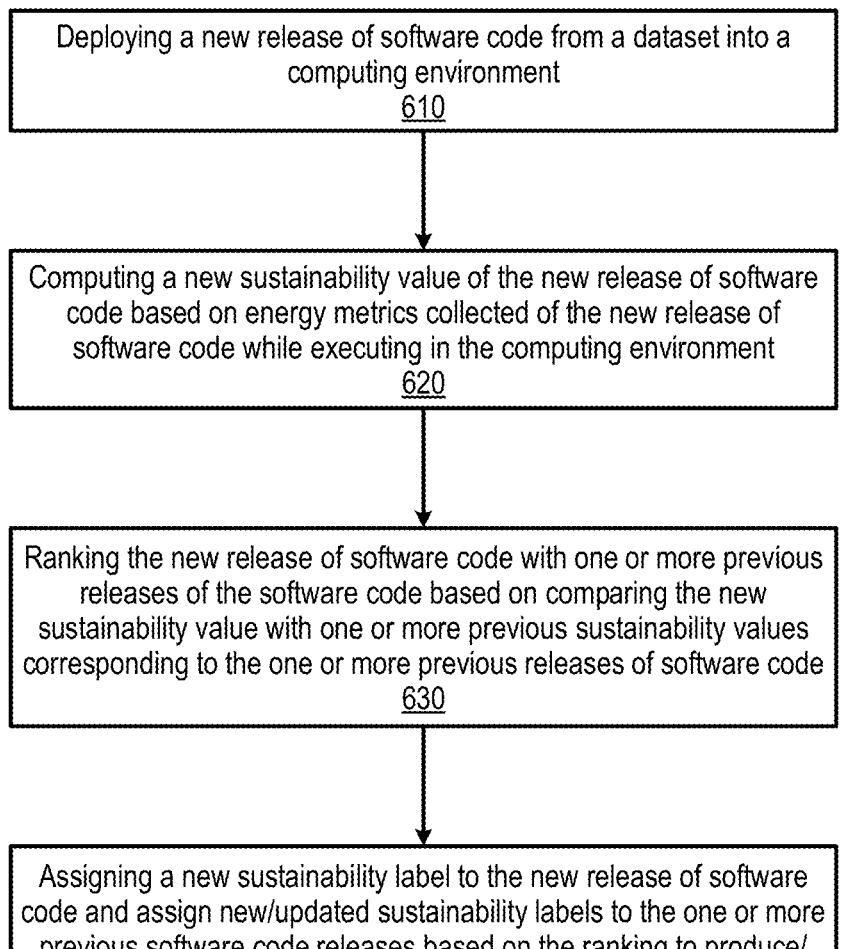

Deploying a new release of software code from a dataset into a computing environment
610

Computing a new sustainability value of the new release of software code based on energy metrics collected of the new release of software code while executing in the computing environment
620

Ranking the new release of software code with one or more previous releases of the software code based on comparing the new sustainability value with one or more previous sustainability values corresponding to the one or more previous releases of software code
630

Assigning a new sustainability label to the new release of software code and assign new/updated sustainability labels to the one or more previous software code releases based on the ranking to produce/update a sustainability-based dataset
640

Processing Device 902

Sustainability Labeling Instructions 925

Main Memory 904

Sustainability Labeling Instructions 925

Static Memory 905

Network Interface Device 908

Network 920

Video Display 910

Alpha-Numeric Input Device 912

Cursor Control Device 914

Signal Generation Device 915

Bus 930

Data Storage Device 918

Machine-Readable Storage Medium 928

Sustainability Labeling Instructions 925

CLOUD NATIVE AUTO-LABELING SYSTEM TO TRAIN CODE GENERATION MODELS

TECHNICAL FIELD

Aspects of the present disclosure relate to dataset labeling, and more particularly, to an approach of auto-labeling software code to produce a sustainability-based dataset.

BACKGROUND

Large language models (LLMs) employ advanced neural network architectures to understand, generate, and manipulate human language with a high degree of proficiency. Large Language Models (LLMs) utilize datasets to train their neural networks, enabling them to learn language patterns, semantics, and contextual relationships necessary for understanding and generating coherent and contextually relevant responses.

Datasets are collections of structured or unstructured data that serve as the foundation for training LLMs, providing examples that enable the models to learn patterns and generate predictions. In addition to text, images, and other forms of data, datasets can also encompass software code snippets, enhancing the capability of LLMs to understand and generate programming-related content.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 2 is a flow diagram of a method for collecting energy metrics of software code, determining a sustainability label for the software code, and assigning the sustainability label to the software code, in accordance with some embodiments of the present disclosure.

FIG. 3A is a block diagram that illustrates an example history table for tracking software code releases and their corresponding sustainability information, in accordance with some embodiments of the present disclosure.

FIG. 3B is a block diagram that illustrates an example sustainability-based dataset table that includes software code releases and their corresponding sustainability labels, in accordance with some embodiments of the present disclosure.

FIG. 6 is a flow diagram of a method for assigning sustainability labels to software code releases based on sustainability information corresponding to previous releases of the software code, in accordance with some embodiments of the present disclosure.

DETAILED DESCRIPTION

Figure 1:
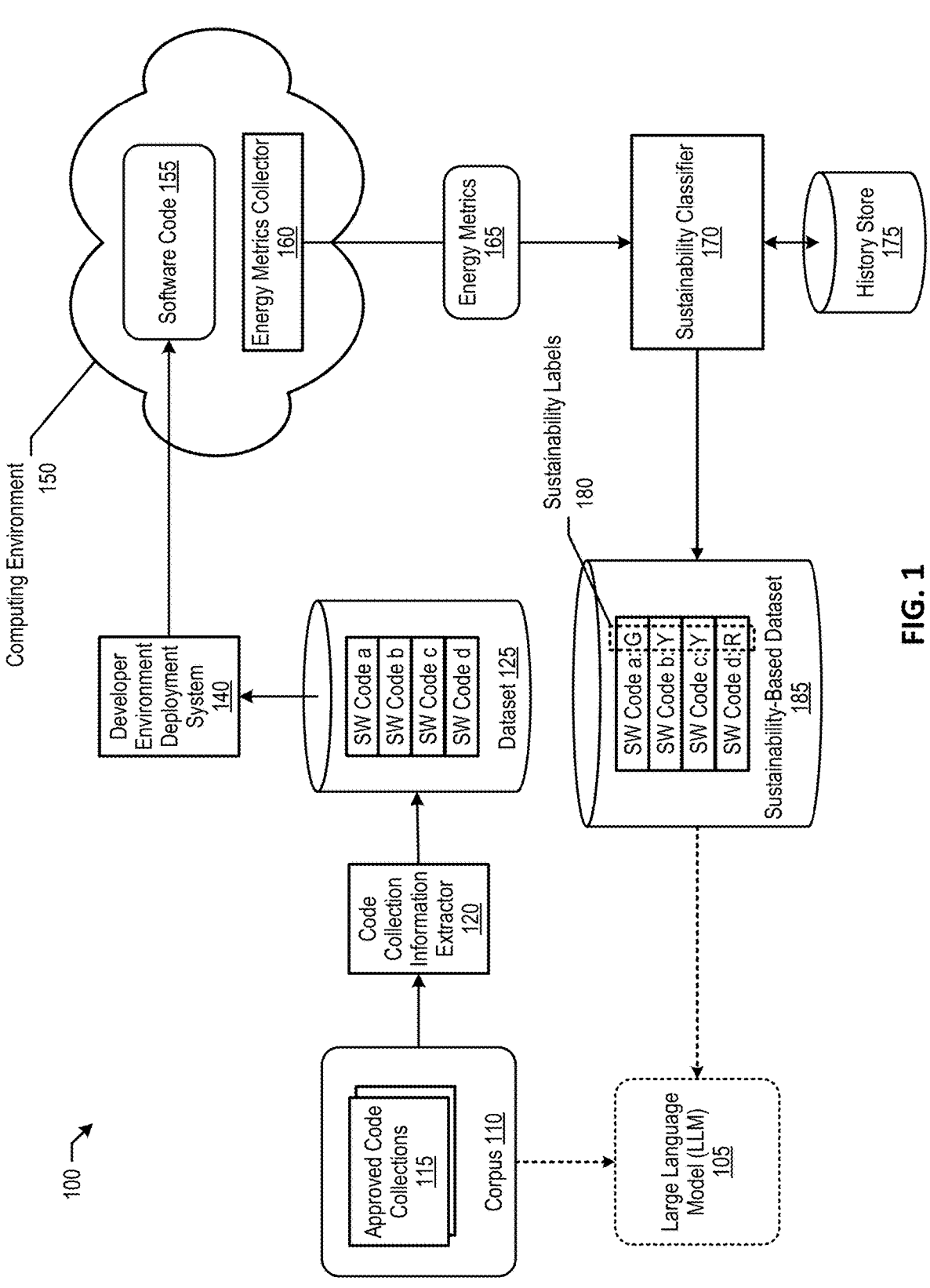
FIG. 1 is a block diagram that illustrates an example system, in accordance with some embodiments of the present disclosure.

In the rapidly evolving landscape of artificial intelligence and natural language processing, Large Language Models (LLMs) have emerged as pivotal tools for understanding and generating human-like text. A key factor driving the effectiveness of LLMs is their ability to leverage expansive and diverse datasets during both training and inference stages. As discussed above, LLMs are trained using extensive datasets that encompass a wide array of data types. These datasets serve as instructional material that allows an LLM to learn intricate linguistic patterns, grammatical structures, and contextual relationships present in human language. The training process involves iteratively presenting the LLM with examples from the dataset and adjusting its internal parameters to minimize the disparity between its predictions and the actual text. This enables the LLM to acquire a nuanced understanding of language semantics, enhancing its capacity to generate coherent and contextually appropriate responses.

One of the notable capabilities of modern LLMs is that of code generation models to produce responses that include suggestions for software code. By integrating programming code snippets within their training datasets, these models offer insightful and contextually relevant code suggestions to user queries. For example, a query related to implementing a specific feature might prompt the LLM to provide code snippets or outline programming structures that could achieve the desired functionality. This feature extends the utility of LLMs beyond natural language interactions and empowers them to assist users in their software development endeavors.

A challenge found with training LLMs and responses provided by LLMs is that neither one considers the "greenness" or environmental impact of the proposed code solutions. While LLMs excel in generating contextually appropriate responses, their training datasets do not inherently account for ecological concerns. Therefore, users seeking energy-efficient or environmentally conscious software code suggestions may be required to apply separate evaluation criteria to assess the ecological implications of the proposed solutions.

The present disclosure addresses the above-noted and other deficiencies by using a processing device to deploy software code from a dataset into a computing environment. The processing device collects energy metrics of the software code executing in the computing environment, and determines a sustainability label for the software code based on the energy metrics. In turn, the processing device assigns the sustainability label to the software code to produce a sustainability-based dataset.

In some embodiments, the processing device computes a sustainability value of the software code based on the energy metrics that indicate a performance per unit of time of the software code executing in the cloud environment. The processing device then determines the sustainability label of the software code based on comparing the sustainability value with one or more previous sustainability values corresponding to one or more previous releases of the software code.

In some embodiments, the software code is a new release of the software code and the sustainability label is a new sustainability label. The processing device adds a table entry into a sustainability table stored in the dataset, which includes the new sustainability label and an identifier corresponding to the new release of the software code. The sustainability table also includes previous table entries corresponding to previous releases of the software code and their corresponding previous sustainability labels.

In some embodiments, the processing device identifies an amount of actions executed by the software code that consume a joule of energy per unit of time. The processing device the uses the identified amount of actions to compute the sustainability value.

In some embodiments, the processing device ranks a new release of software code with one or more previous releases of the software code based on their corresponding sustainability values. Based on the ranking, the processing device assigns a new sustainability label to the new release of software code and also assigns one or more new (updated) sustainability labels to the one or more previous releases of software releases based on the ranking.

In some embodiments, prior to deploying the software code to the computing environment, the processing device extracts code collection information from a playbook. The playbook includes a scripted automation configuration that outlines tasks to be executed. The processing device stores the software code in the dataset in response to determining that at least one of the tasks correspond to the software code. In some embodiments, prior to extracting the code collection information from the playbook, the processing device retrieves the playbook from a set of approved playbooks corresponding to a large learning model (LLM). The processing device trains the LLM using the sustainability-based dataset to produce a trained sustainability-based LLM.

As discussed herein, the present disclosure provides an approach that improves the operation of a computer system by generating a sustainability-based dataset to integrate into the training regimen of an LLM, which enables the LLM to produce software code solutions that account for the ecological consequences of the generated code and, in turn, provides a transformative advancement in the technological field of LLM-assisted code generation. The resulting code not only meets functional requirements but also accounts for the broader technological, ecological, and societal implications of the generated solutions.

FIG. 1 is a block diagram that illustrates an example system, in accordance with some embodiments of the present disclosure. System 100 integrates sustainable practices into the software development lifecycle by producing a sustainability-based dataset of software code based on energy metrics collected of the software code while executing in a computing environment.

Corpus 110 includes approved code collections 115 that, in some embodiments, are Ansible™ playbooks. Ansible is an open-source automation tool that allows users to automate the configuration, management, and deployment of systems and applications. With Ansible, users define their infrastructure as code using YAML (Yet Another Markup Language), which is a declarative language. Ansible uses a client-server architecture, where a central machine, known as the Ansible control node, manages and orchestrates the automation process. The control node connects to the target machines over SSH (Secure Shell protocol) or other protocols and executes tasks that are included in "playbooks." Ansible playbooks define a set of tasks and configurations to be executed on remote systems. A playbook includes one or more plays, and each play includes a set of tasks. Plays are a collection of tasks that are executed together on a group of hosts or a set of hosts defined by patterns. Tasks within a playbook define actions to be performed on the target hosts, such as installing packages, copying files, starting, or stopping services, executing commands, configuring network settings, etc.

In some embodiments, corpus 110 has been used by large language model (LLM) 105 for training. For example, LLM105 may be part of a Wisdom system, which is a joint initiative between Red Hat™ and IBM Research to enhance Ansible with innovative artificial intelligence capabilities. Wisdom for Ansible is an extension of Ansible that provides a set of modules and plugins to integrate with IBM/RedHat cloud services. Wisdom simplifies the deployment and management of applications on IBM Cloud/Red Hat OpenShift™ by providing pre-built playbooks that can be easily customized to fit particular use cases.

Code collection information extractor 120 evaluates approved code collections 115 and identifies software code referenced in approved code collections 115. For example, approved code collections 115 may call software (SW) code a, software code b, software code c, and software code d. The software code, for example, may be microservices, applications, or a combination thereof. Code collection information extractor 120 then stores the software code (or links to the software code) in dataset 125.

Developer environment deployment system 140 retrieves the software code (or links) from dataset 125 and deploys the software code 155 into computing environment 150. In some embodiments, computing environment 150 is a Kubernetes® environment. Kubernetes is an open-source container orchestration platform that provides a framework for automating tasks involved in deploying and maintaining container-based software. Through a combination of declarative configuration and dynamic resource allocation, Kubernetes empowers developers and system administrators to manage the lifecycle of applications across diverse computing environments.

Computing environment 150 also includes energy metrics collector 160. In some embodiments, energy metrics collector 160 is a Kepler tool. Kepler (Kubernetes-based Efficient Power Level Exporter) is an open source project that focuses on reporting, reduction, and regression to help curb energy use. The Kepler tool integrates with Kubernetes (computing environment 150) to collect information, such as from computing environment 150's corresponding processors and memory through eBPF (extended Berkeley Packet Filter) programs to measure and capture performance. Kepler collects data at the kernel level so that the energy can be attributed to processes with as much transparency as possible.

Energy metrics collector 160 collects energy metrics 165 corresponding to software code 155 and provides energy metrics 165 to sustainability classifier 170. In some embodiments, energy metrics 165 is at a code snippet granularity. In some embodiments, energy metrics 165 includes performance per energy metrics that are based on multiple sources.

For example, energy metrics 165 may include power usage of the software code collected from a power monitor program, and also include a performance metric of the software code collected from a performance monitor program.

Sustainability classifier 170 evaluates energy metrics 165 and computes a sustainability value for the software code 155. For example, sustainability classifier 170 may calculate the ratio of the power usage of the software code 155 and the performance metric of the software code 155 to determine a performance per energy metric. In some embodiments, sustainability classifier 170 computes sustainability values for each portion of the software code, such as for each microservice, application, and may also compute sustainability values for portions of a microservice or application.

Once sustainability classifier 170 computes a new sustainability value for the software code, sustainability classifier 170 accesses history store 175 to evaluate the new sustainability value with previous sustainability information corresponding to previous releases of the software code (see FIGS. 3A, 3B, and corresponding text for further details). In some embodiments, sustainability classifier 170 determines a new sustainability label for the new release of software code based on predetermined thresholds (e.g., sustainability value from 0-33→Red, 34-66→Yellow, 67-100→Green) (see FIGS. 2-5 and corresponding text for further details). In some embodiments, other indicators of greenness may be used instead of colors, such as numerical indicators. In some embodiments, sustainability classifier 170 determines a new sustainability label for the new release of software code by ranking the new sustainability value with previous sustainability values, and then assigning new labels to the new release of software code and the previous releases of software code based on their ranking (e.g., bottom ⅓→Red, middle ⅓→Yellow; upper ⅓→Green) (see FIGS. 6-8 and corresponding text for further details).

Sustainability classifier 170 then assigns the sustainability labels 180 to the software code to produce sustainability-based dataset 185. In some embodiments, sustainability classifier 170 assigns sustainability labels 180 to the software code in dataset 125 to transform dataset 125 into a sustainability-based dataset. At this point, sustainability-based dataset 185 may be used to train LLM 105 and become a trained sustainability-based LLM.

FIG. 2 is a flow diagram of a method for collecting energy metrics of software code, determining a sustainability label for the software code, and assigning the sustainability label to the software code, in accordance with some embodiments of the present disclosure.

Method 200 may be performed by processing logic that may include hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 200 may be performed by sustainability classifier 170, processing device 520 shown in FIG. 5, processing device 820 shown in FIG. 8, processing device 902 shown in FIG. 9, or a combination thereof.

With reference to FIG. 2, method 200 illustrates example functions used by various embodiments. Although specific function blocks ("blocks") are disclosed in method 200, such blocks are examples. That is, embodiments are well suited to performing various other blocks or variations of the blocks recited in method 200. It is appreciated that the blocks in method 200 may be performed in an order different than presented, and that not all of the blocks in method 200 may be performed.

With reference to FIG. 2, method 200 begins at block 210, where processing logic receives energy metrics 165 from energy metrics collector 160 and analyzes the energy metrics to determine an amount of actions (e.g., requests, memory accesses, etc.) per joule per unit of time used by software code. In some embodiments, processing logic determines an amount of actions per watt.

At block 220, processing logic computes a sustainability value based on the amount of actions determined in block 210. For example, processing logic may determine that the software code has 200 requests per watt, and processing logic may use a formula that computes s from 0-100. At block 230, processing logic retrieves sustainability information of previous releases of software code from history store 175 (e.g., based on the name of the software code). For example, referring to FIG. 3A, microservice A has had five previous releases 320, and processing logic retrieves this information at block 230.

At block 240, processing logic determines a new sustainability label for the software code based on, for example, comparing the new software code sustainability value with previous sustainability information retrieved in block 230. In some embodiments, processing logic determines a new sustainability label based on a predetermined scale (e.g., sustainability value from 0-33→Red, 34-66→Yellow, 67-100→Green).

At block 250, processing logic stores the new sustainability information for future release analysis in history store 175. Referring to FIG. 3A, processing logic stores new release entry 330 in history table 310, which is stored in history store 175. At block 260, processing logic assigns the sustainability label to the software code to produce sustainability-based dataset 185. In some embodiments, processing logic assigns the sustainability label to the software code (identifier) in dataset 125 to transform dataset 125 into a sustainability-based dataset. In some embodiments, processing logic adds the sustainability label to a table entry that tracks the releases of software code based on, for example, the name of the software code (see FIG. 3B and corresponding text for further details).

FIG. 3A is a block diagram that illustrates an example history table for tracking software code releases and their corresponding sustainability information, in accordance with some embodiments of the present disclosure.

In some embodiments, history store 175 includes history table 310. History table 310 includes table entries of software code and their releases. The example shown in FIG. 3A shows sustainability information for software releases of "Microservice A," which includes entries 320 for previous releases 1-5. History table 310 includes columns, for example that indicate the release number, their corresponding sustainability values, and their corresponding sustainability labels determined by sustainability classifier 170. As can be seen, release 1 corresponds to a sustainability value of 75 and a sustainability label of green; release 2 corresponds to a sustainability value of 65 and a sustainability label of red, and so on.

When sustainability classifier 170 receives energy metrics 165 for a new release of the software code, such as release 6, sustainability classifier 170 adds a new release entry 330 into history table 310. New release entry 330 includes the release number of Microservice A, its corresponding sustainability value computed from its corresponding energy metrics 165, and its corresponding sustainability label determined by sustainability classifier 170 according to embodiments discussed herein. (see FIGS. 1-2, 4-8, and corresponding text for further details).

FIG. 3B is a block diagram that illustrates an example sustainability-based dataset table that includes software code releases and their corresponding sustainability labels, in accordance with some embodiments of the present disclosure. In some embodiments, system 100 creates table 340 and stores table 340 in sustainability-based dataset 185. Table 340 includes entries to track releases of software code and their corresponding sustainability labels to indicate which releases of a particular software code are greener than other releases of software code.

Rows 350 and 355 show release 5 and 6 of Microservice A, which corresponds to a sustainability label of yellow and green, respectively. As such, release 6 of Microservice A is greener than release 5 of Microservice A. Rows 360 and 365 show release 2 and 3 of Microservice B, which corresponds to a sustainability label of Red and Yellow, respectively. Rows 370 and 375 show release 8 and 9 of App C, which both correspond to a sustainability label of Green.

Figure 4:
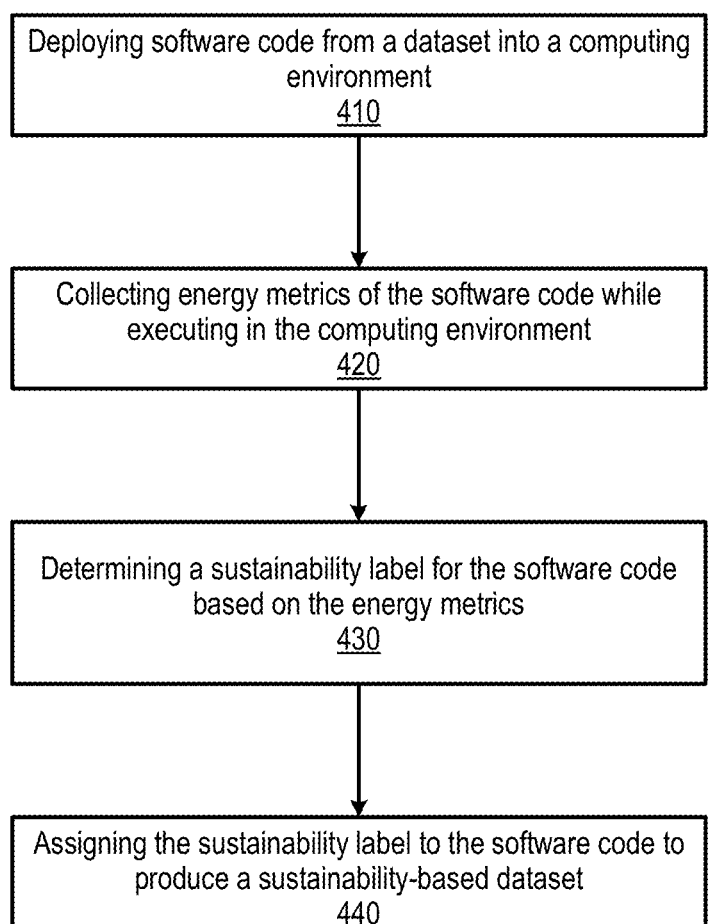
FIG. 4 is a flow diagram of a method for assigning a sustainability label to software code to produce a sustainability-based dataset, in accordance with some embodiments of the present disclosure.

FIG. 4 is a flow diagram of a method for assigning a sustainability label to software code to produce a sustainability-based dataset, in accordance with some embodiments of the present disclosure.

Method 400 may be performed by processing logic that may include hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 400 may be performed by sustainability classifier 170, processing device 520 shown in FIG. 5, processing device 820 shown in FIG. 8, processing device 902 shown in FIG. 9, or a combination thereof.

With reference to FIG. 4, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

With reference to FIG. 4, method 400 begins at block 410, where processing logic deploys software code from a dataset into a computing environment, such as computing environment 150 shown in FIG. 1. At block 420, processing logic collects energy metrics of the software code executing in the computing environment. For example, referring to FIG. 1, energy metrics collector 160 collects energy metrics 165 of software code 155 executing in computing environment 150.

At block 430, processing logic determines a sustainability label for the software code based on the energy metrics. Referring to FIG. 1, sustainability classifier 170 receives energy metrics 165 and determines a sustainability label for the software code. In some embodiments, processing logic computes a sustainability value of the software code based on the energy metrics that indicate a performance per unit of time of the software code executing in the cloud environment. In some embodiments, processing logic identifies an amount of actions executed by the software code that consume a joule of energy per unit of time. Processing logic then uses the identified amount of actions to compute the sustainability value. In turn, processing logic determines the sustainability label of the software code based on comparing the sustainability value with one or more previous sustainability values corresponding to one or more previous releases of the software code.

At block 440, processing logic assigns the sustainability label to the software code to produce a sustainability-based dataset. Referring to FIG. 1, sustainability classifier 170 assigns one of labels 180 to one of the software codes to produce sustainability-based dataset 185.

Figure 5:
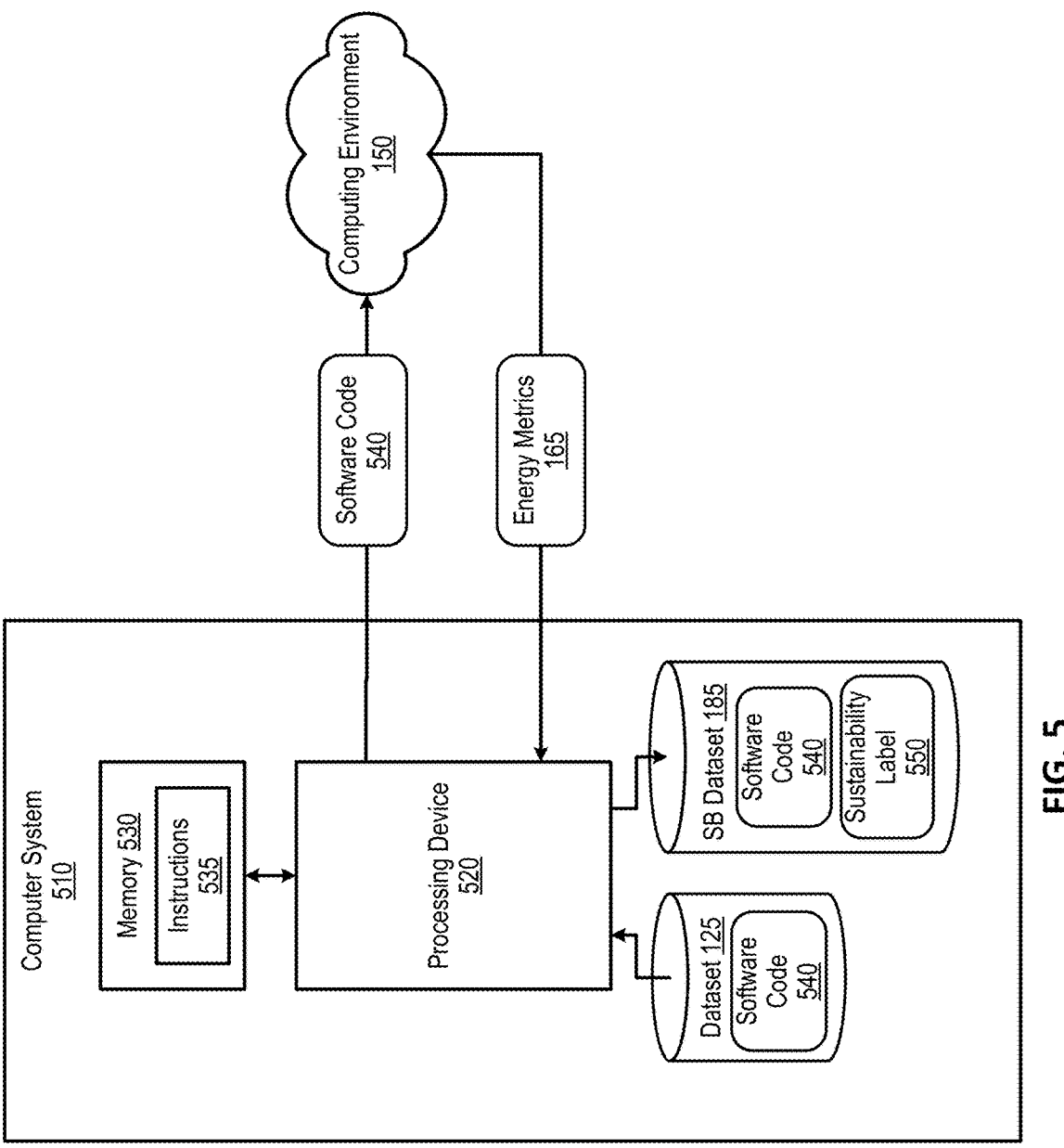
FIG. 5 is a block diagram that illustrates an example system for producing a sustainability-based dataset based on collected software code energy metrics, in accordance with some embodiments of the present disclosure.

FIG. 5 is a block diagram that illustrates an example system for producing a sustainability-based dataset based on collected software code energy metrics, in accordance with some embodiments of the present disclosure.

System 500 includes computer system 510, which includes processing device 520 and memory 530. Memory 530 stores instructions 535 that processing device 520 executes. During execution, processing device 520 deploys software code 540 from dataset 125 into a computing environment 150. Processing device 520 collects energy metrics 165 of the software code while executing in computing environment 150. In some embodiments, a Kepler tool, such as energy metrics collector 160, collects the energy metrics and provides the energy metrics to processing device 520.

Processing devices 520 determines a sustainability label 550 for the software code 540 based on the energy metrics 165 and, in turn, assigns the sustainability label to the software code 540 to produce a sustainability-based (SB) dataset 185. In some embodiments, processing device 520 assigns sustainability label 550 to software code 540 in dataset 125 to transform dataset 125 into a sustainability-based dataset.

FIG. 6 is a flow diagram of a method for assigning sustainability labels to software code releases based on sustainability information corresponding to previous releases of the software code, in accordance with some embodiments of the present disclosure.

Method 600 may be performed by processing logic that may include hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 600 may be performed by sustainability classifier 170, processing device 520 shown in FIG. 5, processing device 820 shown in FIG. 8, processing device 902 shown in FIG. 9, or a combination thereof.

With reference to FIG. 6, method 600 illustrates example functions used by various embodiments. Although specific function blocks ("blocks") are disclosed in method 600, such blocks are examples. That is, embodiments are well suited to performing various other blocks or variations of the blocks recited in method 600. It is appreciated that the blocks in method 600 may be performed in an order different than presented, and that not all of the blocks in method 600 may be performed.

With reference to FIG. 6, method 600 begins at block 610, where processing logic deploys a new release of software code from a dataset into a computing environment, such as computing environment 150 shown in FIG. 1. At block 620, processing logic computes a new sustainability value of the new release of software code based on energy metrics collected of the new release of software code while executing in the computing environment. As discussed above, in some embodiments, processing logic computes a sustainability value of the software code based on the energy metrics that indicate a performance per unit of time of the software code executing in the cloud environment. In some embodiments, processing logic identifies an amount of actions executed by the software code that consume a joule of energy per unit of time. Processing logic then uses the identified amount of actions to compute the sustainability value.

Figure 7:
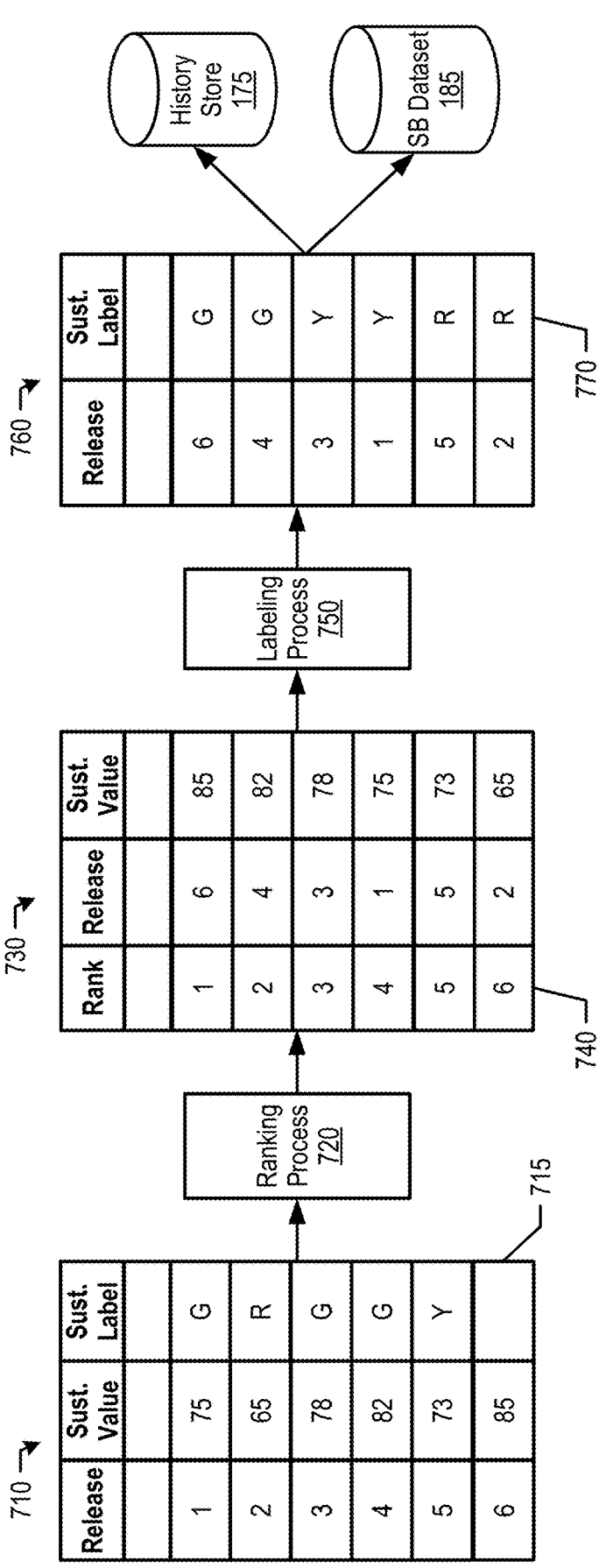
FIG. 7 is a block diagram that illustrates an approach of ranking software code releases based on sustainability information relative to their corresponding previous releases of software code, in accordance with some embodiments of the present disclosure.

At block 630, processing logic ranks the new release of software code with one or more previous releases of software code based on comparing the new sustainability value with one or more previous sustainability values corresponding to the one or more previous releases of software code (see FIG. 7, table 730, and corresponding text for further details). At block 640, processing logic assigns a plurality of new sustainability labels to the new release of software code and the one or more previous releases of software code based on the ranking to produce/update a sustainability-based dataset (see FIG. 7, table 760 and corresponding text for further details). In some embodiments, processing logic adds a new table entry corresponding to the new release of software code into a sustainability table with a corresponding one of the plurality of new sustainability labels. The sustainability table further includes one or more previous table entries corresponding to the one or more previous releases of the software code and their corresponding one or more previous sustainability labels. Processing logic updates the one or more pervious sustainability labels with one more of the plurality of new sustainability labels. In some embodiments, processing logic removes one or more of the previous releases of software code from the sustainability table based on one or more criteria, such as maintaining sustainability information of the past two releases.

FIG. 7 is a block diagram that illustrates an approach of ranking software code releases based on sustainability information relative to their corresponding previous releases of software code, in accordance with some embodiments of the present disclosure.

Diagram 700 shows a ranking process and a labeling process performed by sustainability classifier 170 to rank and label new releases of software code relative to previous releases of software code. In some embodiments, sustainability classifier 170 re-labels previous releases of software code based on their corresponding rankings. For example, a previous release of software code may initially receive a low sustainability label, but after several releases of the software code, sustainability classifier 170 may determine that one of the previous releases should be assigned a higher sustainability label relative to the other releases. As such, sustainability classifier 170 may replace the original sustainability label of the previous release with a higher sustainability label (discussed in more detail below).

Table 710 includes sustainability information for software releases 1-5, which includes their corresponding sustainability values and their corresponding previously assigned sustainability labels. Table 710 may be stored in history store 175, sustainability-based dataset 185, or a combination thereof. When sustainability classifier 170 receives energy metrics 165 corresponding to release 6 of the software code, sustainability classifier 170 adds a table entry 715 with its corresponding sustainability value of 85. Entry 715 does not yet include a sustainability label for release 6 because, as discussed below, sustainability classifier 170 first ranks release 6 relative to releases 1-5.

Sustainability classifier 170 performs ranking process 720, which ranks releases 1-6 based on their corresponding sustainability values. Table 730 shows rankings 740, which ranks release 6 as 1$^{st}$ due to it having the highest sustainability value of 85. Releases 4, 3, 1, 5, and 2 are subsequently ranked based on their corresponding sustainability values of 82, 78, 75, 73, and 65.

Next, sustainability classifier 170 performs labeling process 750 on table 730. In some embodiments, sustainability classifier 170 partitions the table entries into thirds and ranks the third highest releases as "green," the middle third releases as "yellow," and the lower third releases as "red." Table 760 shows that releases 6 and 4 are assigned a "G" sustainability label for green, releases 3 and 1 are assigned a "Y" sustainability label for yellow, and releases 5 and 2 are assigned an "R" label for red. As can be seen, release 5 was initially labeled as yellow in table 710, but is now re-labeled as R in table 760. Similarly, release 1 was initially labeled as green in table 710, but it is now labeled as yellow in table 760. By iteratively re-ranking and re-labeling releases of software code, sustainability classifier 170 continually maintains updated sustainability information of the various releases of software code.

Figure 8:
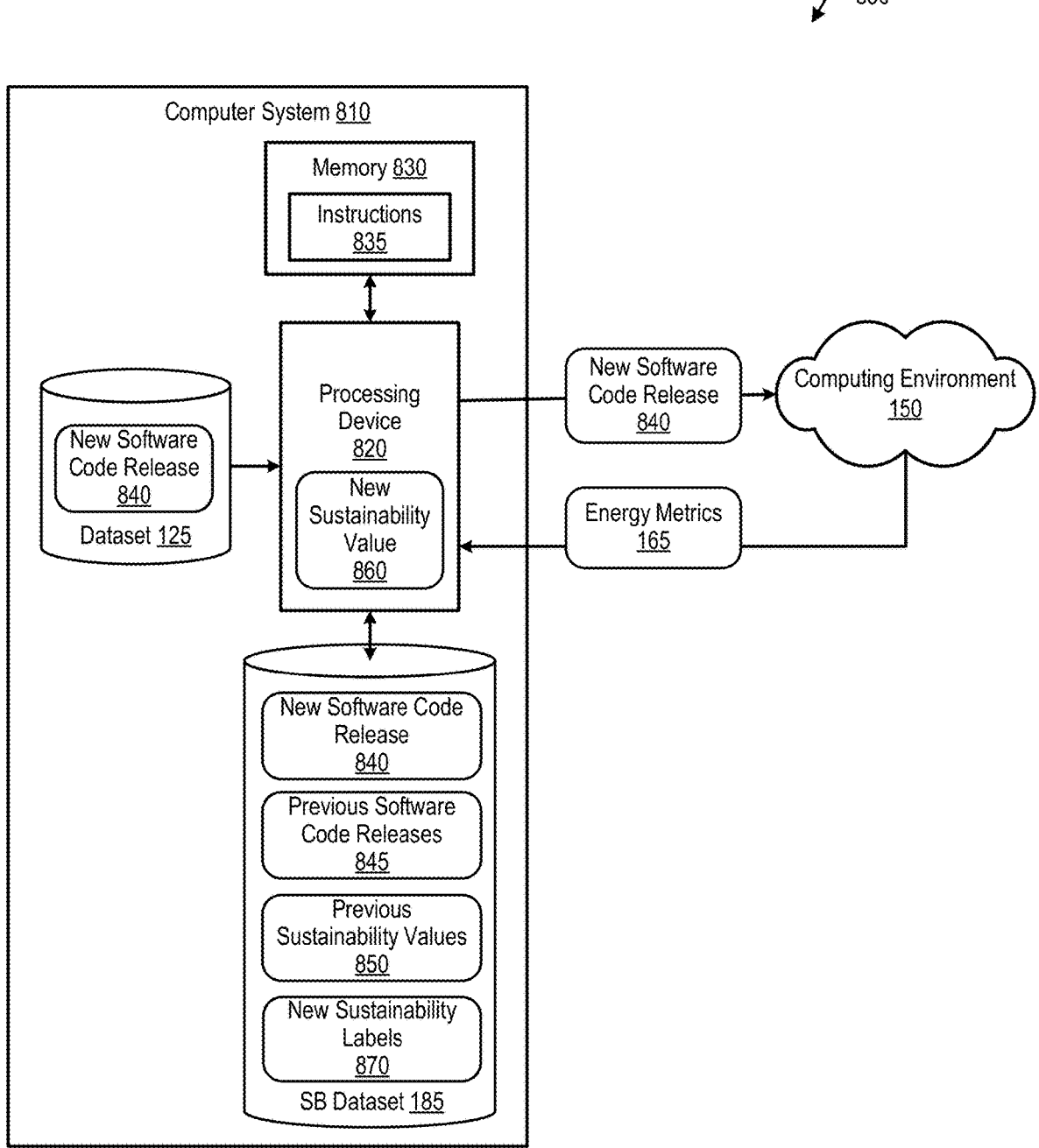
FIG. 8 is a block diagram that illustrates an example system for ranking software code releases based on sustainability information relative to their corresponding previous releases of software code, in accordance with some embodiments of the present disclosure.

FIG. 8 is a block diagram that illustrates an example system for ranking software code releases based on sustainability information relative to their corresponding previous releases of software code, in accordance with some embodiments of the present disclosure.

Diagram 800 shows computer system 810, which includes processing device 820 and memory 830. Memory 830 stores instructions 835 that processing device 820 executes. During execution, processing device 820 deploys a new release of software code 840 from a dataset 125 into a computing environment 150. Processing device 820 computes a new sustainability value 860 of the new release of software code 840 based on energy metrics 165 collected of the new release of software code 840 while executing in the computing environment 150.

Processing device 820 ranks the new release of software code 840 with one or more previous releases of software code 845 based on comparing the new sustainability value 860 with one or more previous sustainability values 850 corresponding to the one or more previous releases of software code 845.

Processing device 820 assigns a new sustainability label 870 to the new release of software code 840 and the one or more previous releases of software code 845 based on their corresponding ranking (see FIG. 7 and corresponding text for further details).

Figure 9:
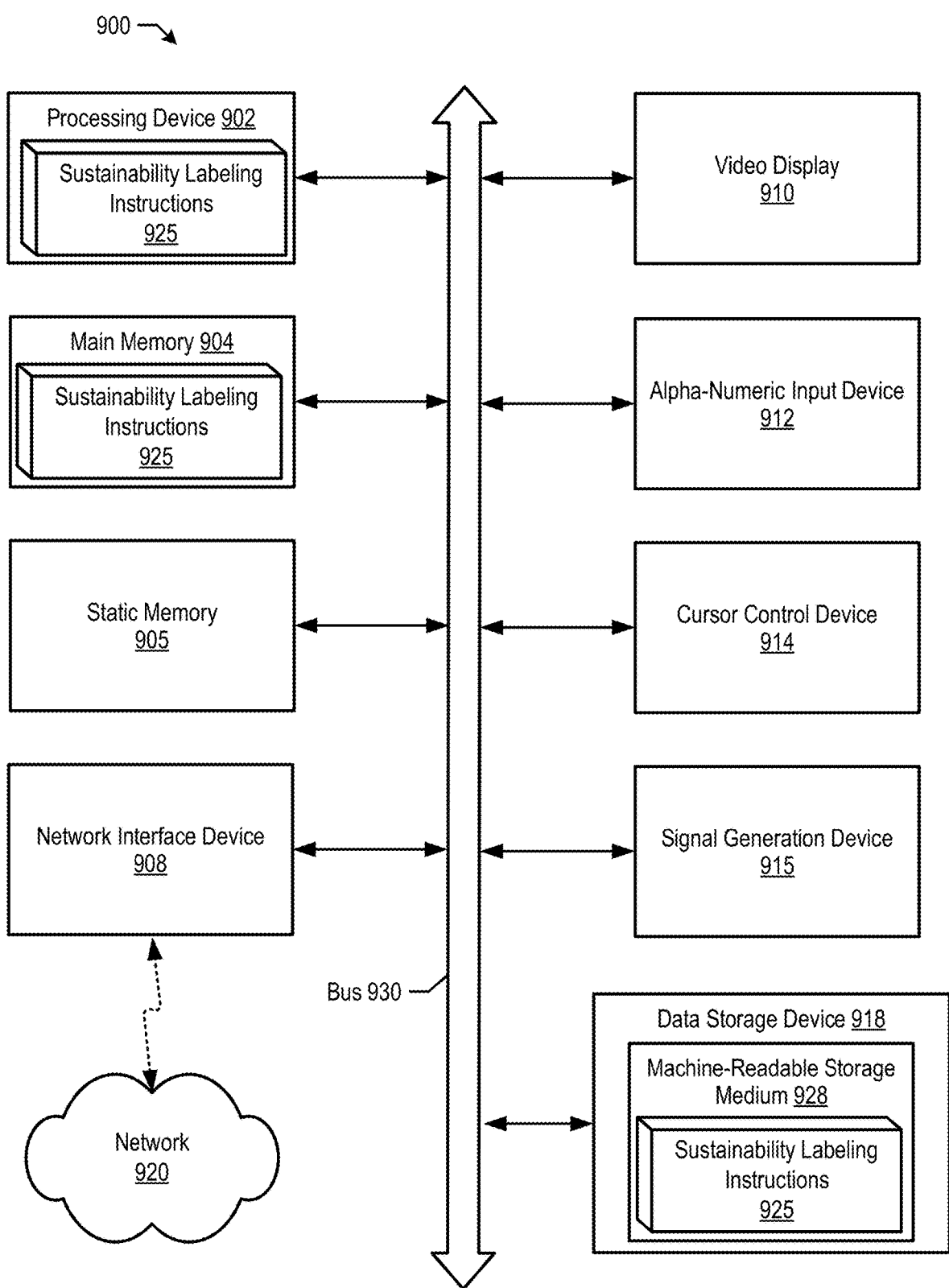
FIG. 9 is a block diagram of an example computing device that may perform one or more of the operations described herein, in accordance with some embodiments of the present disclosure.

FIG. 9 illustrates a diagrammatic representation of a machine in the example form of a computer system 900 within which a set of instructions, for causing the machine to perform any one or more of the methodologies discussed herein for intelligently scheduling containers.

In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In some embodiments, computer system 900 may be representative of a server.

Computer system 900 includes a processing device 902, a main memory 904 (e.g., read-only memory (ROM), flash memory, dynamic random access memory (DRAM), a static memory 906 (e.g., flash memory, static random access memory (SRAM), etc.), and a data storage device 918 which communicate with each other via a bus 930. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Computer system 900 may further include a network interface device 908 which may communicate with a network 920. Computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse) and an acoustic signal generation device 916 (e.g., a speaker). In some embodiments, video display unit 910, alphanumeric input device 912, and cursor control device 914 may be combined into a single component or device (e.g., an LCD touch screen).

Processing device 902 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 is configured to execute sustainability labeling instructions 925, for performing the operations and steps discussed herein.

The data storage device 918 may include a machine-readable storage medium 928, on which is stored one or more sets of sustainability labeling instructions 925 (e.g., software) embodying any one or more of the methodologies of functions described herein. The sustainability labeling instructions 925 may also reside, completely or at least partially, within the main memory 904 or within the processing device 902 during execution thereof by the computer system 900; the main memory 904 and the processing device 902 also constituting machine-readable storage media. The sustainability labeling instructions 925 may further be transmitted or received over a network 920 via the network interface device 908.

The machine-readable storage medium 928 may also be used to store instructions to perform a method for intelligently scheduling containers, as described herein. While the machine-readable storage medium 928 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Example 1 is a method comprising: deploying software code from a dataset into a computing environment; collecting energy metrics of the software code while executing in the computing environment; determining, by a processing device, a sustainability label for the software code based on the energy metrics; and assigning the sustainability label to the software code to produce a sustainability-based dataset.

Example 2 is the method of Example 1, wherein the software code is a new release of the software code and the sustainability label is a new sustainability label, the method further comprising: computing a new sustainability value of the new release of software code based on the energy metrics, wherein the energy metrics indicate a performance per unit of time of the new release of software code while executing in the computing environment; and determining the new sustainability label of the new release of software code based on comparing the new sustainability value with one or more previous sustainability values corresponding to one or more previous releases of the software code.

Example 3 is the method of any of Examples 1-2, further comprising: adding a new table entry comprising the new sustainability label and corresponding to the new release of software code into a sustainability table, wherein the sustainability table further comprises one or more previous table entries corresponding to the one or more previous releases of the software code and their corresponding one or more previous sustainability labels.

Example 4 is the method of any of Examples 1-3, further comprising: identifying an amount of actions executed by the new release of the software code that consume a joule of energy per unit of time; and using the identified amount of actions to compute the new sustainability value.

Example 5 is the method of any of Examples 1-4, further comprising: ranking the new release of software code with the one or more previous releases of the software code based on their corresponding sustainability values; assigning, based on the ranking, the new sustainability label to the new release of software code; and assigning one or more updated sustainability labels to the one or more previous releases of software releases based on the ranking Example 6 is the method of any of Examples 1-5, wherein, prior to deploying the software code, the method further comprises: extracting code collection information from a playbook, wherein the playbook comprises a scripted automation configuration that outlines one or more tasks to be executed; and determining that at least one of the one or more tasks correspond to the software code.

Example 7 is the method of any of Examples 1-6, wherein, prior to deploying the software code, a plurality of approved playbooks comprising the playbook are utilized by a large learning model (LLM, further comprising: training the LLM using the sustainability label and the software code to produce a trained sustainability-based LLM.

Example 8 is a system comprising: a processing device; and a memory to store instructions that, when executed by the processing device cause the processing device to: deploy software code from a dataset into a computing environment; collect energy metrics of the software code while executing in the computing environment; determine a sustainability label for the software code based on the energy metrics; and assign the sustainability label to the software code to produce a sustainability-based dataset.

Example 9 is the system of Example 8, wherein the software code is a new release of the software code and the sustainability label is a new sustainability label, and wherein the processing device, responsive to executing the instructions, further causes the system to: compute a new sustainability value of the new release of software code based on the energy metrics, wherein the energy metrics indicate a performance per unit of time of the new release of software code while executing in the computing environment; and determine the sustainability label of the new release of software code based on comparing the new sustainability value with one or more previous sustainability values corresponding to one or more previous releases of the software code.

Example 10 is the system of any of Examples 8-9, wherein the processing device, responsive to executing the instructions, further causes the system to: add a new table entry comprising the new sustainability label and corresponding to the new release of software code into a sustainability table, wherein the sustainability table further comprises one or more previous table entries corresponding to the one or more previous releases of the software code and their corresponding one or more previous sustainability labels.

Example 11 is the system of any of Examples 8-10, wherein the processing device, responsive to executing the instructions, further causes the system to: identify an amount of actions executed by the new release of the software code that consume a joule of energy per unit of time; and use the identified amount of actions to compute the new sustainability value.

Example 12 is the system of any of Examples 8-11, wherein the processing device, responsive to executing the instructions, further causes the system to: rank the new release of software code with the one or more previous releases of the software code based on their corresponding sustainability values; assign, based on the ranking, the new sustainability label to the new release of software code; and assign one or more updated sustainability labels to the one or more previous releases of software releases based on the ranking.

Example 13 is the system of any of Examples 8-12, wherein, prior to deploying the software code, the processing device, responsive to executing the instructions, further causes the system to: extract code collection information from a playbook, wherein the playbook comprises a scripted automation configuration that outlines one or more tasks to be executed; and determine that at least one of the one or more tasks correspond to the software code.

Example 14 is the system of any of Examples 8-13, wherein, prior to deploying the software code, a plurality of approved playbooks comprising the playbook are utilized by a large learning model (LLM), and wherein, prior to deploying the software code, the processing device, responsive to executing the instructions, further causes the system to: train the LLM using the sustainability label and the software code to produce a trained sustainability-based LLM.

Example 15 is a non-transitory computer readable medium, having instructions stored thereon which, when executed by a processing device, cause the processing device to: deploy software code from a dataset into a computing environment; collect energy metrics of the software code while executing in the computing environment; determine, by the processing device, a sustainability label for the software code based on the energy metrics; and assign the sustainability label to the software code to produce a sustainability-based dataset.

Example 16 is the non-transitory computer readable medium of Example 15, wherein the software code is a new release of the software code and the sustainability label is a new sustainability label, and wherein the processing device is to: compute a new sustainability value of the new release of software code based on the energy metrics, wherein the energy metrics indicate a performance per unit of time of the new release of software code while executing in the computing environment; and determine the sustainability label of the new release of software code based on comparing the new sustainability value with one or more previous sustainability values corresponding to one or more previous releases of the software code.

Example 17 is the non-transitory computer readable medium of any of Examples 15-16, wherein the processing device is to: add a new table entry comprising the new sustainability label and corresponding to the new release of software code into a sustainability table, wherein the sustainability table further comprises one or more previous table entries corresponding to the one or more previous releases of the software code and their corresponding one or more previous sustainability labels.

Example 18 is the non-transitory computer readable medium of any of Examples 15-17, wherein the processing device is to: identify an amount of actions executed by the new release of the software code that consume a joule of energy per unit of time; and use the identified amount of actions to compute the new sustainability value.

Example 19 is the non-transitory computer readable medium of any of Examples 15-18, wherein the processing device is to: rank the new release of software code with the one or more previous releases of the software code based on their corresponding sustainability values; assign, based on the ranking, the new sustainability label to the new release of software code; and assign one or more updated sustainability labels to the one or more previous releases of software releases based on the ranking.

Example 20 is the non-transitory computer readable medium of any of Examples 15-18, wherein, prior to deploying the software code, the processing device is to: extract code collection information from a playbook, wherein the playbook comprises a scripted automation configuration that outlines one or more tasks to be executed; and determine that at least one of the one or more tasks correspond to the software code.

Example 20 is the non-transitory computer readable medium of any of Examples 15-19, wherein, prior to deploying the software code, a plurality of approved playbooks comprising the playbook are utilized by a large learning model (LLM), and wherein the processing device is to: train the LLM using the sustainability label and the software code to produce a trained sustainability-based LLM.

Example 21 is an apparatus comprising: means to deploy software code from a dataset into a computing environment; collecting energy metrics of the software code while executing in the computing environment; means to determine a sustainability label for the software code based on the energy metrics; and means to assign the sustainability label to the software code in the dataset to produce a sustainability-based dataset.

Example 22 is the apparatus of Example 21, wherein the software code is a new release of the software code and the sustainability label is a new sustainability label, further comprising: means to compute a new sustainability value of the new release of software code based on the energy metrics, wherein the energy metrics indicate a performance per unit of time of the new release of software code while executing in the computing environment; and means to determine the new sustainability label of the new release of software code based on comparing the new sustainability value with one or more previous sustainability values corresponding to one or more previous releases of the software code.

Example 23 is the apparatus of any of Examples 21-22, further comprising: means to add a new table entry comprising the new sustainability label and corresponding to the new release of software code into a sustainability table, wherein the sustainability table further comprises one or more previous table entries corresponding to the one or more previous releases of the software code and their corresponding one or more previous sustainability labels.

Example 24 is the apparatus of any of Examples 21-23, further comprising: means to identify an amount of actions executed by the new release of the software code that consume a joule of energy per unit of time; and means to use the identified amount of actions to compute the new sustainability value.

Example 25 is the apparatus of any of Examples 21-24, wherein, prior to deploying the software code, further comprising: means to extract code collection information from a playbook, wherein the playbook comprises a scripted automation configuration that outlines one or more tasks to be executed; and means to determine that at least one of the one or more tasks correspond to the software code.

Example 26 is the apparatus of any of Examples 21-25, wherein, prior to deploying the software code, a plurality of approved playbooks comprising the playbook are utilized by a large learning model (LLM).

Example 27 is the apparatus of any of Examples 21-26, further comprising: means to train the LLM using the sustainability label and the software code to produce a trained sustainability-based LLM.

Example 28 is a method comprising: deploying a new release of software code from a dataset into a computing environment; computing a new sustainability value of the new release of software code based on energy metrics collected of the new release of software code while executing in the computing environment; ranking the new release of software code with one or more previous releases of software code based on comparing the new sustainability value with one or more previous sustainability values corresponding to the one or more previous releases of software code; and assigning a new sustainability label to the new release of software code and assign new/updated sustainability labels to the one or more previous releases of software code based on the ranking to produce/update a sustainability-based dataset.

Example 29 is the method of Example 28, further comprising: adding a new table entry corresponding to the new release of software code into a sustainability table with a corresponding one of the plurality of new sustainability labels, wherein the sustainability table further comprises one or more previous table entries corresponding to the one or more previous releases of the software code and their corresponding one or more previous sustainability labels; and updating the one or more pervious sustainability labels with one more of the plurality of new sustainability labels.

Example 30 is the method of any of Examples 28-29, further comprising: removing one or more of the previous releases of software code from the sustainability table based on one or more criteria.

Example 31 is the method of any of Examples 28-30, wherein the energy metrics indicate a performance per unit of time of the new release of software code while executing in the computing environment.

Example 32 is the method of any of Examples 28-31, further comprising: identifying an amount of actions executed by the new release of the software code that consume a joule of energy per unit of time; and using the identified amount of actions to compute the new sustainability value.

Example 33 is the method of any of Examples 28-32, wherein, prior to deploying the software code, the method further comprises: extracting code collection information from a playbook, wherein the playbook comprises a scripted automation configuration that outlines one or more tasks to be executed; and determining that at least one of the one or more tasks correspond to the software code.

Example 34 is the method of any of Examples 28-33, wherein, prior to deploying the software code, a plurality of approved playbooks comprising the playbook are utilized by a large learning model (LLM), further comprising: training the LLM using the sustainability label and the software code to produce a trained sustainability-based LLM.

Example 35 a system comprising: a processing device; and a memory to store instructions that, when executed by the processing device cause the processing device to: deploy a new release of software code from a dataset into a computing environment; compute a new sustainability value of the new release of software code based on energy metrics collected of the new release of software code while executing in the computing environment; rank the new release of software code with one or more previous releases of software code based on comparing the new sustainability value with one or more previous sustainability values corresponding to the one or more previous releases of software code; and assign, in the dataset, a plurality of new sustainability labels to the new release of software code and the one or more previous releases of software code based on the ranking.

Example 36 is the system of Example 35, wherein the processing device, responsive to executing the instructions, further causes the system to: add a new table entry corresponding to the new release of software code into a sustainability table with a corresponding one of the plurality of new sustainability labels, wherein the sustainability table further comprises one or more previous table entries corresponding to the one or more previous releases of the software code and their corresponding one or more previous sustainability labels; and update the one or more pervious sustainability labels with one more of the plurality of new sustainability labels.

Example 37 is the system of any of Examples 35-36, wherein the processing device, responsive to executing the instructions, further causes the system to: remove one or more of the previous releases of software code from the sustainability table based on one or more criteria.

Example 38 is the system of any of Examples 35-37, wherein the energy metrics indicate a performance per unit of time of the new release of software code while executing in the computing environment.

Example 39 is the system of any of Examples 35-38, wherein the processing device, responsive to executing the instructions, further causes the system to: identify an amount of actions executed by the new release of the software code that consume a joule of energy per unit of time; and using the identified amount of actions to compute the new sustainability value.

Example 40 is the system of any of Examples 35-39, wherein, prior to deploying the software code, the processing device, responsive to executing the instructions, further causes the system to: extract code collection information from a playbook, wherein the playbook comprises a scripted automation configuration that outlines one or more tasks to be executed; and determine that at least one of the one or more tasks correspond to the software code.

Unless specifically stated otherwise, terms such as "deploying," "collecting," "determining," "assigning," "adding," "computing," "identifying," "using," "extracting," "ranking," "training," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a," "an" and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. § 112 (f) for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the present disclosure to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the present disclosure is not to be limited to the details given herein, but may be modified within the scope and equivalents of the appended claims.

What is claimed is:

1. A method comprising:
deploying software code from a dataset into a computing environment;
collecting energy metrics of the software code while executing in the computing environment;
determining, by a processing device, a sustainability label for the software code based on the energy metrics;
assigning the sustainability label to the software code to produce a sustainability-based dataset; and
training a large language model (LLM) using the sustainability-based dataset to produce a trained sustainability-based LLM.

2. The method of claim 1, wherein the software code is a new release of the software code and the sustainability label is a new sustainability label, the method further comprising:

computing a new sustainability value of the new release of software code based on the energy metrics, wherein the energy metrics indicate a performance per unit of time of the new release of software code while executing in the computing environment; and determining the new sustainability label of the new release of software code based on comparing the new sustainability value with one or more previous sustainability values corresponding to one or more previous releases of the software code.

3. The method of claim 2, further comprising:

adding a new table entry comprising the new sustainability label and corresponding to the new release of software code into a sustainability table, wherein the sustainability table further comprises one or more previous table entries corresponding to the one or more previous releases of the software code and their corresponding one or more previous sustainability labels.

4. The method of claim 2, further comprising:

identifying an amount of actions executed by the new release of the software code that consume a joule of energy per unit of time; and using the identified amount of actions to compute the new sustainability value.

5. The method of claim 2, further comprising:

ranking the new release of software code with the one or more previous releases of the software code based on their corresponding sustainability values;

assigning the new sustainability label to the new release of software code based on the ranking; and assigning one or more updated sustainability labels to the one or more previous releases of software code based on the ranking.

6. The method of claim 1, wherein, prior to deploying the software code, the method further comprises:

extracting code collection information from a playbook, wherein the playbook comprises a scripted automation configuration that outlines one or more tasks to be executed; and identifying the software code based on the at least one of the one or more tasks.

7. The method of claim 6, wherein, prior to deploying the software code, a plurality of approved playbooks comprising the playbook are utilized by the LLM.

8. A system comprising:

a processing device; and a memory to store instructions that, when executed by the processing device cause the processing device to:

deploy software code from a dataset into a computing environment;

collect energy metrics of the software code while executing in the computing environment;

determine a sustainability label for the software code based on the energy metrics;

assign the sustainability label to the software code to produce a sustainability-based dataset; and train a large language model (LLM) using the sustainability-based dataset to produce a trained sustainability-based LLM.

9. The system of claim 8, wherein the software code is a new release of the software code and the sustainability label is a new sustainability label, and wherein the processing device, responsive to executing the instructions, further causes the system to:

compute a new sustainability value of the new release of software code based on the energy metrics, wherein the energy metrics indicate a performance per unit of time of the new release of software code while executing in the computing environment; and determine the sustainability label of the new release of software code based on comparing the new sustainability value with one or more previous sustainability values corresponding to one or more previous releases of the software code.

10. The system of claim 9, wherein the processing device, responsive to executing the instructions, further causes the system to:

add a new table entry comprising the new sustainability label and corresponding to the new release of software code into a sustainability table, wherein the sustainability table further comprises one or more previous table entries corresponding to the one or more previous releases of the software code and their corresponding one or more previous sustainability labels.

11. The system of claim 9, wherein the processing device, responsive to executing the instructions, further causes the system to:

identify an amount of actions executed by the new release of the software code that consume a joule of energy per unit of time; and use the identified amount of actions to compute the new sustainability value.

12. The system of claim 9, wherein the processing device, responsive to executing the instructions, further causes the system to:

rank the new release of software code with the one or more previous releases of the software code based on their corresponding sustainability values;

assign the new sustainability label to the new release of software code based on the ranking; and assign one or more updated sustainability labels to the one or more previous releases of software code based on the ranking.

13. The system of claim 8, wherein, prior to deploying the software code, the processing device, responsive to executing the instructions, further causes the system to:

extract code collection information from a playbook, wherein the playbook comprises a scripted automation configuration that outlines one or more tasks to be executed; and identify the software code based on the at least one of the one or more tasks.

14. The system of claim 13, wherein, prior to deploying the software code, a plurality of approved playbooks comprising the playbook are utilized by the LLM.

15. A non-transitory computer readable medium, having instructions stored thereon which, when executed by a processing device, cause the processing device to:

deploy software code from a dataset into a computing environment;

collect energy metrics of the software code while executing in the computing environment;

determine, by the processing device, a sustainability label for the software code based on the energy metrics;

assign the sustainability label to the software code to produce a sustainability-based dataset; and train a large language model (LLM) using the sustainability-based dataset to produce a trained sustainability-based LLM.

16. The non-transitory computer readable medium of claim 15, wherein the software code is a new release of the software code and the sustainability label is a new sustainability label, and wherein the processing device is configured to:

compute a new sustainability value of the new release of software code based on the energy metrics, wherein the energy metrics indicate a performance per unit of time of the new release of software code while executing in the computing environment; and determine the sustainability label of the new release of software code based on comparing the new sustainability value with one or more previous sustainability values corresponding to one or more previous releases of the software code.

17. The non-transitory computer readable medium of claim 16, wherein the processing device is configured to:

add a new table entry comprising the new sustainability label and corresponding to the new release of software code into a sustainability table, wherein the sustainability table further comprises one or more previous table entries corresponding to the one or more previous releases of the software code and their corresponding one or more previous sustainability labels.

18. The non-transitory computer readable medium of claim 16, wherein the processing device is configured to:

identify an amount of actions executed by the new release of the software code that consume a joule of energy per unit of time; and use the identified amount of actions to compute the new sustainability value.

19. The non-transitory computer readable medium of claim 16, wherein the processing device is configured to:

rank the new release of software code with the one or more previous releases of the software code based on their corresponding sustainability values;

assign the new sustainability label to the new release of software code based on the ranking; and assign one or more updated sustainability labels to the one or more previous releases of software code based on the ranking.

20. The non-transitory computer readable medium of claim 15, wherein, prior to deploying the software code, the processing device is configured to:

extract code collection information from a playbook, wherein the playbook comprises a scripted automation configuration that outlines one or more tasks to be executed; and identify the software code based on the at least one of the one or more tasks.

* * * * *